United States Patent [19]

Renegar et al.

[11] 4,057,456
[45] Nov. 8, 1977

[54] APPARATUS FOR TRIMMING AN EXTRUDATE

[75] Inventors: Charles Gwin Renegar; Frank Edward Colbeck, both of Shelbyville, Tenn.

[73] Assignee: Hasbro Industries, Inc., Pawtucket, R.I.

[21] Appl. No.: 667,116

[22] Filed: Mar. 15, 1976

[51] Int. Cl.² .............................................. B32B 31/00
[52] U.S. Cl. ..................................... 156/515; 425/289; 425/306; 425/317; 425/456; 83/411 R
[58] Field of Search ..................... 83/170, 171, 411 R, 83/6; 425/456, 317, 289, 294, 306, 316, DIG. 201, 392; 156/515, 221, 156

[56] References Cited

U.S. PATENT DOCUMENTS

| | | | |
|---|---|---|---|
| 2,031,573 | 2/1936 | Peterson | 425/294 |
| 2,047,021 | 7/1936 | Friden | 83/411 R |
| 2,321,735 | 6/1943 | Clifford | 83/411 R X |
| 2,516,602 | 7/1950 | Snyder | 83/170 X |
| 2,551,811 | 5/1951 | Mueller | 83/170 |
| 3,067,644 | 12/1962 | Dearsley | 83/411 R X |
| 3,257,883 | 6/1966 | Dearsley | 83/411 R X |

*Primary Examiner*—Robert L. Spicer, Jr.
*Attorney, Agent, or Firm*—Shapiro and Shapiro

[57] ABSTRACT

Apparatus for cutting an extrudate to finished length includes a hopper that receives rough-cut lengths of extrudate, and feeds them one at a time to holders on a movable carrier. Each holder captures a length of extrudate which is transported by movement of the carrier to a pair of heated blades spaced apart a distance equal to the desired finished length of the extrudate. The blades serve to cut a portion from each end of the extrudate in a holder, whereby the extrudate is trimmed to finished length, and, simultaneously to fuse the material of the extrudate at the end faces, thereby sealing such faces. Further movement of the carrier enables the holders to release the trimmed extrudate onto a conveyor.

15 Claims, 4 Drawing Figures

APPARATUS FOR TRIMMING AN EXTRUDATE

BACKGROUND OF THE INVENTION

This invention relates to apparatus for trimming an extrudate to a finished length, and more particularly to apparatus for trimming a thermoplastic pencil extrudate.

Pencils are now manufactured on a continuous basis by extruding a thermoplastic sheathing composition over a thermoplastic marking core. After leaving the extruder, the continuous extrudate is conditioned by being cooled in order to make the extrudate rigid, sized in order to obtain a uniform cross section, and smoothed to obtain a surface suitable for coating. The conditioned extrudate is then coated on a continuous basis, and then cut to roughly the finished length of a pencil. Because further processing steps necessary to complete the manufacture of a pencil are mechanized, it is essential for the rough-cut lengths to be trimmed to an exact length.

SUMMARY OF THE INVENTION

The present invention provides apparatus for simultaneously cutting a pencil extrudate to finished length, and fusing and sealing each end of the pencil to preclude migration of dust from the marking core. Such apparatus includes a hopper that receives rough-cut lengths of extrudate, and feeds them, one at a time, to spaced holders on a movable carrier. Each holder captures a length of extrudate which is transported by movement of the carrier past a pair of heated blades spaced apart a distance equal to the desired finished length of the extrudate. As the carrier moves a captured extrudate past the heated blades, a portion at each end of the extrudate is cut off trimming the extrudate to finished length. Simultaneously with cutting, the heated blades fuse the material of the extrudate thereby sealing its trimmed axial ends. Further movement of the carrier allows the holder to release the trimmed extrudate onto a conveyor.

BRIEF DESCRIPTION OF THE DRAWINGS

An embodiment of the invention is shown in the accompanying drawings, wherein.

DESCRIPTION OF THE PREFERRED EMBODIMENT

Figure 4:
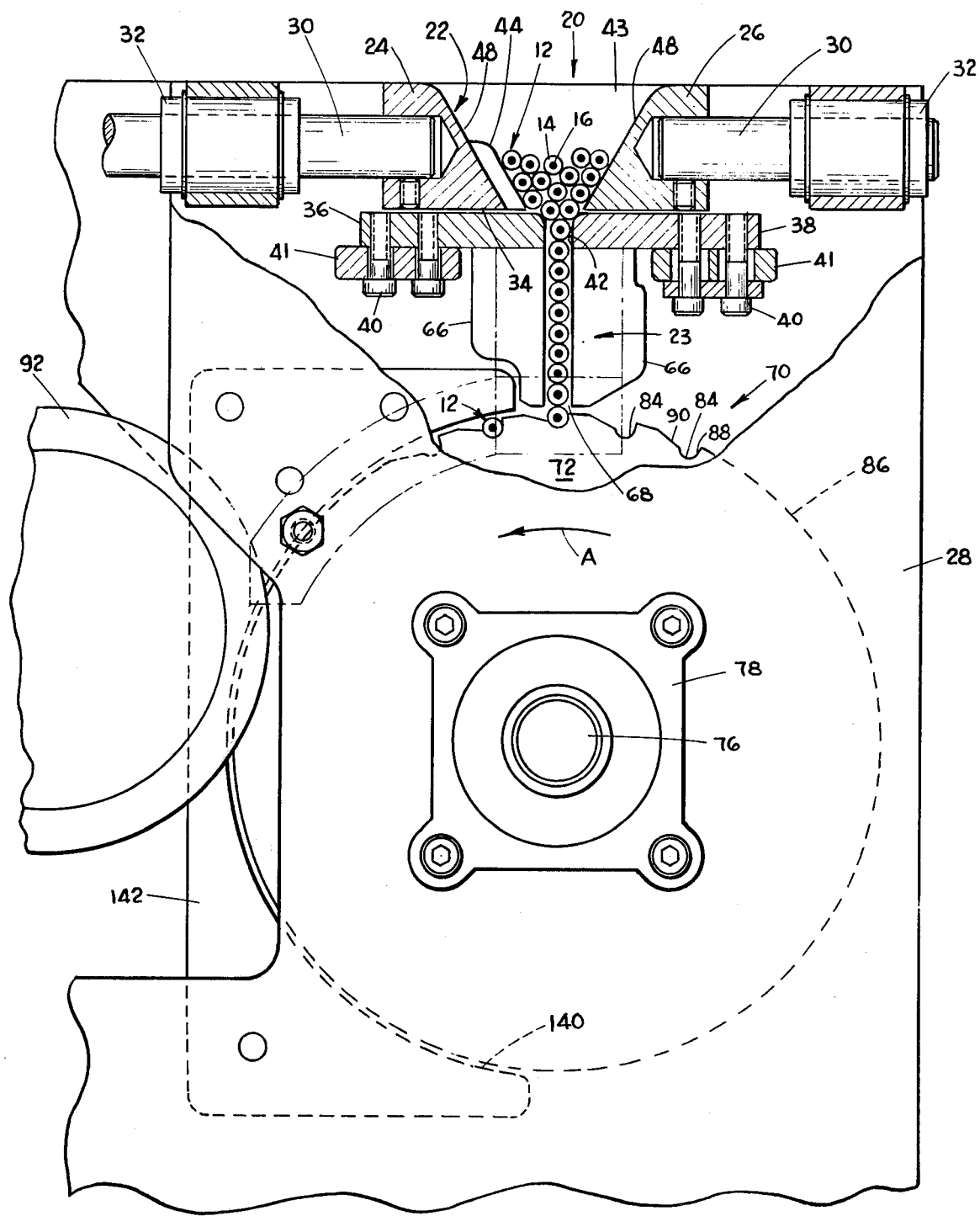
FIG. 4 is an enlarged side view of the hopper and magazine of the apparatus with portions broken away to facilitate illustration.

In the drawings, reference numeral 10 designates apparatus according to the present invention for trimming rough-cut lengths of pencil extrudate 12 to finished length. As shown in FIG. 4, each length of extrudate 12 comprises a sheath 14 surrounding a co-axial core 16 of marking material. While the lengths are shown in FIG. 4 to have a round cross-section, they could have other cross-sections such as hexagonal, for example. The extrudate is formed on a continuous basis by apparatus (not shown) wherein a thermoplastic sheathing composition is extruded over a thermoplastic marking core composition. After leaving the extruder, the extrudate is conditioned by apparatus (not shown) in which the continuous extrudate is cooled, sized, and surface-smoothed. Following this conditioning, the continuous extrudate is coated, and then cut roughly to length. The rough-cut lengths 12 are fed from feeder mechanism 18 (FIG. 1) into hopper means 20 comprising, as shown in FIG. 4, hopper 22 and magazine 23.

The lengths of extrudate fed from feeder 18 into hopper 22 are oriented with their axes horizontally disposed (FIG. 4) and drop between a pair of oppositely positioned guide bars 24, 26 mounted between fixed front and rear frame elements 28 of the apparatus. Each guide bar is generally triangular in cross section, and is carried by a pair of spaced rods 30 mounted in ball bushings 32 carried by the frame elements so that limited horizontal displacement of the bars can take place. The bottom surface 34 of the bars slidably engage a pair of plates 36, 38 which are adjustably mounted by bolts 40 on bars 41 attached to the frame such that the spacing or throat 42 between the bars can be adjusted to accommodate pencils of different diameters or sizes.

Figure 1:
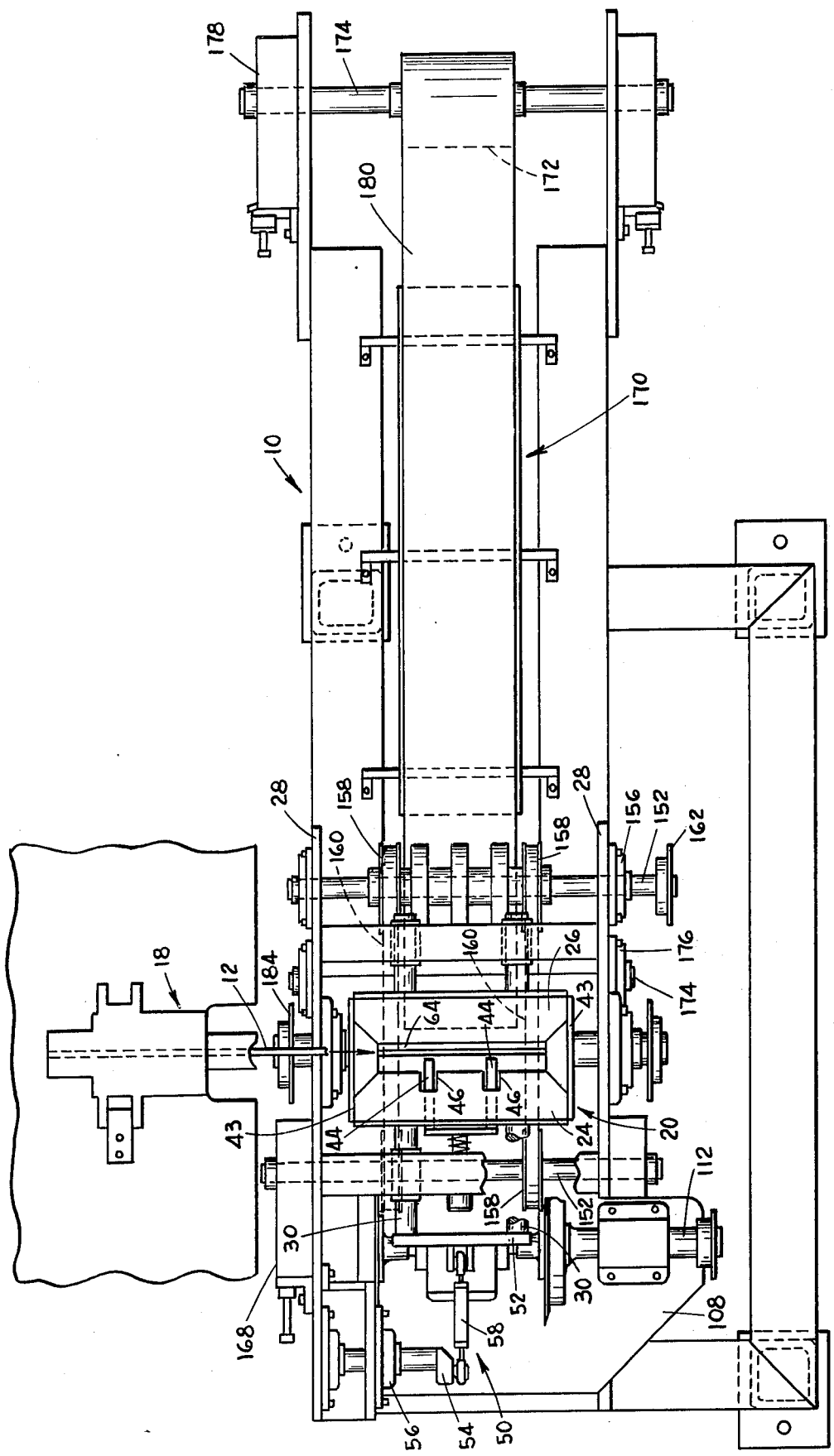
FIG. 1 is a top plan view of the apparatus.

The axial ends of the hopper are closed by cap plates 43 which have inclined faces cooperable with the axial ends of lengths of extrudate for the purpose of moving such lengths into the proper position relative to throat 42 as described below. In order to assist in feeding lengths of extrudate from the hopper into the magazine through throat 42, a pair of spring biased guide brackets 44 are provided. These brackets project through slots 46 in guide bar 24 as shown in FIG. 1, and terminate between the spaced inclined walls 48 (FIG. 4) of bars 24, 26. Means 50 (FIGS. 1 and 2) for vibrating bar 24 comprises end bar 52 rigidly interconnecting the free ends of rods 30 on bar 24, eccentric arm 54 rotatably mounted in bearing 56 on the frame, link 58 pivotally connecting arm 54 to end bar 52, and power means in the form of motor 60 (FIG. 2) and gear box 62. Arm 54 is rotated by an output (not shown) of the gear box through a flexible link, such as a chain or V-belt drive (not shown). Means 50 serves to vibrate bar 24 in the direction of the axes of the lengths of extrudate lying between walls 48 of the bars 24, 26. Brackets 44 remain stationary, except for resilient displacement by the pressure of the length of extrudate contained in the hopper; and the combination of the vibrating bar 24 and the brackets 44 serve to continuously feed lengths of extrudate into the throat 42 at the entrance to magazine 23, the throat being defined by the facing edges of plates 36 and 38.

Each of plates 36 and 38 has a pair of spaced guides 66 at opposite lateral ends which guide the opposite axial ends of the rough-cut lengths of extrudate and form magazine 23 having an opening 68 at the bottom through which lengths of horizontally disposed extrudate are fed by gravity to carrier means 70. The horizontal spacing between the guides 66 at each end of the pencil plates is set by adjusting bolts 40 to accommodate the extrudate allowing them to remain horizontally disposed as shown in FIG. 4, and stacked one above the other so that they can be removed, seriatim, by carrier 70 as it moves relative to opening 68.

Carrier 70 includes a pair of plates 72 (FIG. 3) mounted on the axial ends of hollow hub 74 carried by horizontal shaft 76 mounted on bearings 78 for rotation on the frame elements 28. The axial length of the hub is made such that the axial distance between the outer surfaces 80 of the plates are less than the length of a rough-cut extrudate. Disposed on carrier 70 are a plurality of spaced holder means 82 that sequentially pass opening 68 as the carrier moves. Holder means 82 are constituted by a plurality of holders 84 (FIG. 4) spaced around the periphery of the plates, the holders in one plate being aligned with the holders in the other plate. Each holder is in the form of a semicircular notch in the peripheral edge of a plate, each notch being defined in part by a radially extending side 88, and an inclined edge 90 on its leading side.

Carrier 70 is positioned such that the peripheries 86 of plates 72 are located immediately below opening 68 in the magazine (FIG. 4), with shaft 76 being aligned with the longitudinal axis of the opening. Furthermore, the axial position of the shaft is such that the surfaces 80 are centered relative to the axial ends of the opening 68. Rotation of the plates, occasioned by rotation of shaft 76, is in the direction shown by arrow A in FIG. 4 such that the inclined edge 90 of each holder leads the radial side 88.

In order to rotate shaft 76, chain sprocket 91 (FIG. 3) on one end of the shaft is operatively connected by a chain (not shown) to an output of the gearbox 62. The speed of rotation is adjusted to allow the carrier to remove one length of extrudate from the magazine for each length fed into the hopper by feeder 18.

By reason of the above-described construction, the carrier is rotatable in the direction of arrow A, and lengths of extrudate drop from the magazine, one at a time, seriatim, into paris of aligned notches 84 as the latter pass beneath aperture 68 during movement of the carrier. The depth of each notch is such that a length of extrudate is releasably captured in the aligned notches and is held through a rotation of at least 90° of the plates, i.e., until the notch is no longer capable of retaining the extrudate against the pull of gravity.

When a pair of notches 84 is positioned beneath the opening 68 and a length of extrudate drops into these notches, the axial ends of the extrudate will project beyond the axial end faces 80 of plates 72. These projecting end portions are trimmed away by cutter means 92 located at an angle less than 90° from the axis of the magazine as shown in FIG. 4. This relative angular position enables the length of extrudate to be securely held by the carrier during the trimming operation because the pressure exerted by the cutter means on a length of extrudate held in a pair of aligned notches is absorbed by the plate, without allowing the length of extrudate to become unseated.

Figure 3:
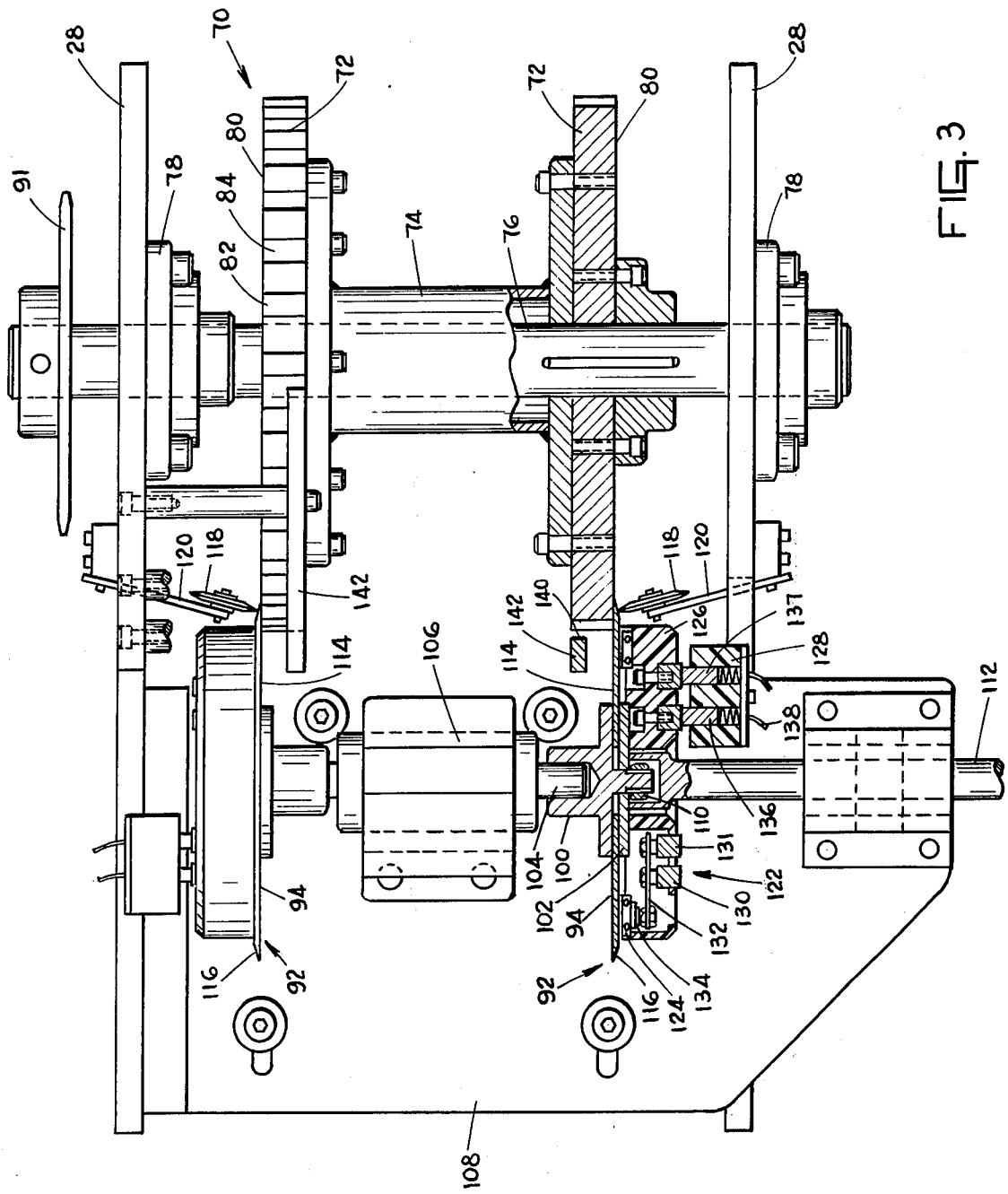
FIG. 3 is an enlarged view taken generally along the line 3—3 of FIG. 2.

Cutter means 92 is constituted by a pair of spaced knives 94 respectively engaging a peripheral portion of surface 80 of the plates, as shown in FIG. 3. Each knife is a circular disc captured between the flange of a mounting hub 100 and a backup plate 102 attached to the flange. Hub 100 is mounted on spindle 104 which is rotatably carried in bearing assembly 106 attached to an extension arm rigidly connected to the main portion of frame 108 to which elements 28 are secured.

One of the hubs carries a spline fitting 110 operatively engaging the free end of a driving shaft 112 by which rotation is imparted to the knives. Shaft 112 is driven by a chain and sprocket arrangement (not shown) from an output of gearbox 62.

Shafts 112 and 104 are coaxial and disposed parallel to shaft 76 so that inwardly directed flat surface 114 on each disc 94 is perpendicular to the axis of rotation thereof. The outer surface of each disc has a tapered peripheral portion 116 that intersects the surface 114 at an acute angle causing the disc to sharply trim away each end of a length of extrudate as the latter is carried past the knives by the holder means on the carrier.

The axial spacing of the discs on spindle 104 is such that surfaces 114 closely overlie respective surfaces 80 of the plates 72 on the carrier. To maintain close tolerances on the trimmed length of extrudate, it is preferred to have the surface 114 of each disc in sliding contact with the surface 80, such contact being maintained by pressure wheels 118. Each wheel is rotatably mounted on a holder 120 which is fixed to the frame elements 28 causing the pressure wheels to bear against the tapered peripheral portion 116 of each knife 94 in the region where surface 114 ofthe knife is sliding engagement with surface 80 on the plates of the carrier. As a consequence, each end of a length of extrudate carried past the knives is trimmed off squarely with respect to the axis of the extrudate.

In addition to trimming a rough-cut length of extrudate to finished length, cutter means 92 simultaneously fuses the material of the extrudate where it interfaces with the knife. This fusing action serves to seal each end of the pencil and thus precludes migration of dust from the marking core of the pencil. The fusing and sealing action is achieved by causing the knives to be heated. To this end, means 122 is provided for heating cutter means 92. As shown in FIG. 3, means 122 includes an electrical resistance heater element 124 clamped to each knife 94 on the surface thereof opposite surface 114 which engages surface 80 of the plate 72. Insulating annular ring 126 fixed to backup plate 102 clamps element 124 to the knife.

Electrical power is supplied to each heater-element via brush-holder assembly 128 attached to frame element 28 and two slip-rings 130, 131 attached to ring 126. Each slip ring has a bus 132 individually connecting the slip-ring to one of the two terminals 134 of a heater element. Slidably engaged with each slip-ring is a spring-loaded carbon brush 136, 137 mounted in assembly 128, and power is applied to each brush through leads 138.

After a pair of upwardly-facing aligned notches 84 have transported a length of extrudate beyond the cutter means 92, due to rotation of carrier means 70, the notches will begin to face downwardly and the length would tend to drop out of the notches. The lengths of extrudate are retained in the downwardly-facing notches, however, by the circular edges 140 of guide plates 142, which are attached to elements 28 of the frame and are spaced apart a distance less than the distance between surfaces 80 of plates 72. Edges 140 terminate at the lowermost periphery of plates 72 so that as a pair of notches carries a finished length of extrudate beyond the terminus of each guide plate, the length will slide out of the pair of aligned notches along edges 90 (FIG. 4) and drop onto conveyor means 146 (FIG. 2) carried by frame 108 of the apparatus. Receiving end 148 of the conveyor means is located vertically below plates 72 of the carrier means for receiving the trimmed lengths of extrudate as the carrier means moves.

Figure 2:
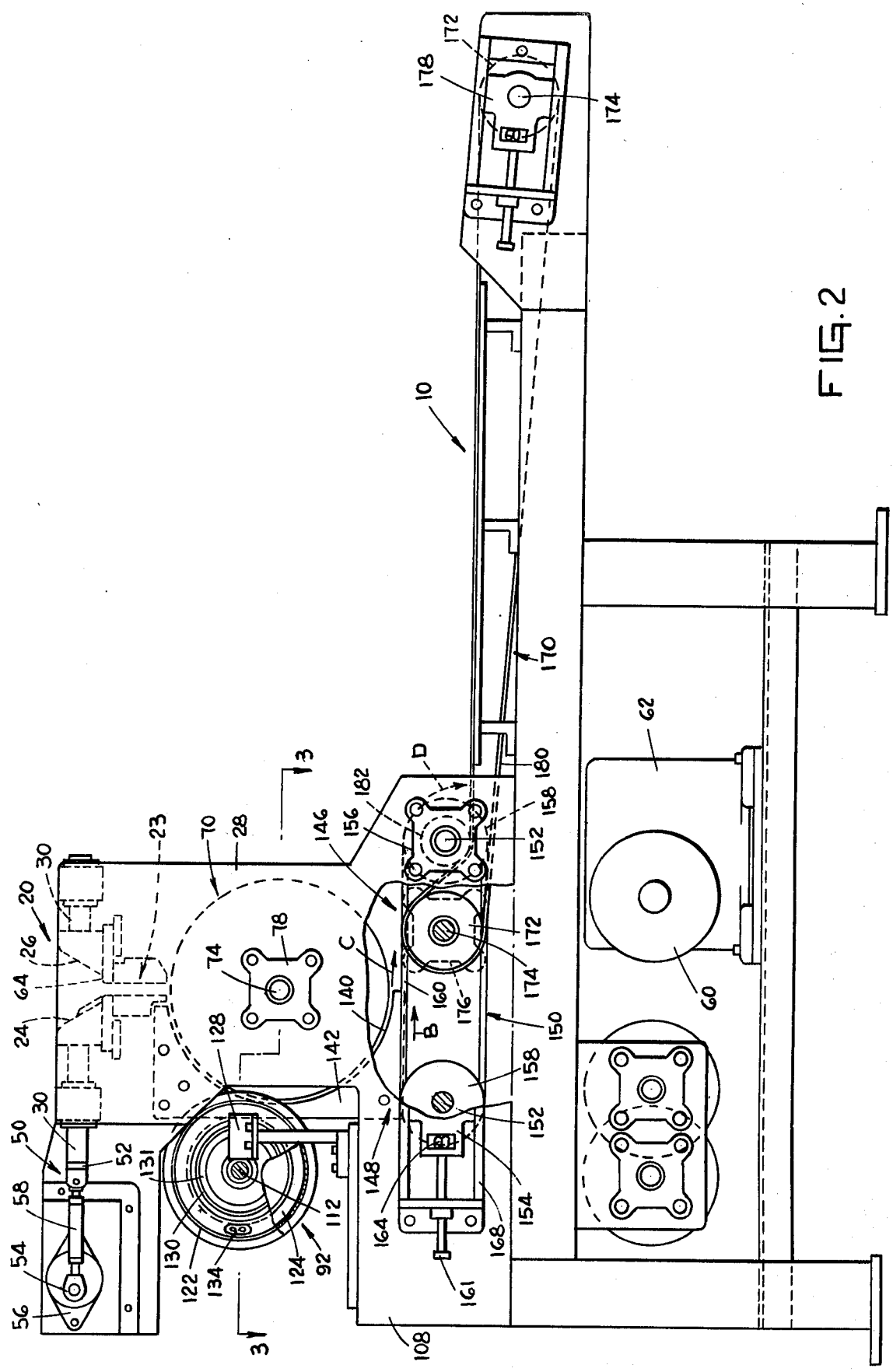
FIG. 2 is a side view of the apparatus with portions broken away to better illustrate components of the apparatus.

Conveyor means 146 (as shown in FIG. 2) includes a first conveyor 150 having a pair of spaced shafts 152 rotatably mounted in bearing blocks 154, 156, carried by frame 108. Each shaft carries a pair of spaced V-belt pulleys 158 so that two pairs of aligned pulleys (FIG. 1) are defined. Each pair of aligned pulleys has a V-belt 160 operatively engaged therewith. Tension adjustment of the V-belts is carried out by rotating screw 161 in the proper direction which varies the axial position of nut 164 and slides block 154 along track 168 attached to frame 108.

Non-shiftable drive shaft 152 of the first conveyor is mounted in fixed bearing block 156, and carries at one end a sprocket 162 (FIG. 1) engaged with a chain-drive (not shown) operatively associated with an output shaft (not shown) of gear box 62. The top course of V-belts 160 moves in the direction of arrow B and receives finished lengths of extrudate as indicated by arrow C, as such lengths are discharged by the rotation of the carrier means.

As shown in FIGS. 1 and 2, finished lengths of extrudate, with their ends fused and sealed, are transferred from the first conveyor 150 to a second conveyor 170 comprising a pair of drums 172 carried by shafts 174 rotatably mounted in bearing blocks 176, 178 attached to frame 108, and a flat belt 180. Fixed bearing blocks 176 are located in elements 28 of the frame and are positioned intermediate bearings 154 and 156 of the first conveyor. Furthermore, the top-most portion of belt 180, where it passes over drum 172 on shaft 174 mounted in bearing 176, is no higher than the plane of the topcourse of the first conveyor allowing the finishing lengths of extrudate to pass freely over belt 180. Belt 180 then passes beneath idler roller 182 rotatably mounted on non-shiftable shaft 152 intermediate pulleys 158, and continues horizontally until it passes around drum 172 carried by shiftable shaft 174. Tension in belt 180 is adjusted in the same manner as adjustment is achieved in the V-belts of the first conveyor.

The second conveyor is powered by sprocket 184 attached to non-shiftable shaft 174 (FIG. 1) engaged with a chain-drive (not shown) operatively associated with gear box 62. The top course of belt 180 is driven in the same direction as the top course of the V-belts of the first conveyor.

Finished lengths of extrudate on the first conveyor are carried on the top course thereof beyond the receiving end of the second conveyor defined by the non-shiftable shaft 174. When the lengths reach the end of the first conveyor, they drop in the direction of arrow D onto the flat belt 180 and are conveyed away for packing or further processing.

It is believed that the advantages and improved results furnished by the Apparatus of the invention will be apparent from the foregoing description of several preferred embodiments of the invention. Various changes and modifications may be made without departing from the spirit and scope of the invention as sought to be defined in the following claims.

We claim:
1. Apparatus for trimming an extrudate to finished length and fusing the ends thereof, comprising:
   a. hopper means for receiving and orienting rough-cut lengths of extrudate, and having an outlet through which oriented lengths of extrudate are adapted to pass;
   b. a movable carrier having a plurality of spaced holder means operatively passing the outlet as the carrier moves;
   c. each holder means adapted to releasably capture a length of extrudate from the outlet as the carrier moves the holder means past the outlet;
   d. a pair of spaced, rotatable cutter discs operatively positioned relative to the carrier for trimming each end of a length of extrudate captured by a holder means as the carrier moves the holder means past the cutter, discs and
   e. means for heating the cutter discs whereby each end of the length of extrudate is fused simultaneously with being trimmed.

2. Apparatus according to claim 1, wherein each holder means releases a captured length of extrudate after the carrier moves the holder means past the cutter discs, the apparatus including conveyor means for receiving trimmed extrudate released by the holder means.

3. Apparatus according to claim 1, wherein the hopper means includes a magazine for horizontally orienting the lengths of extrudate, one above the other, the outlet of the hopper means being an opening in the bottom of the magazine through which the lengths of extrudate are fed by gravity to the movable carrier.

4. Apparatus according to claim 3, wherein the carrier includes a pair of carrier plates mounted for rotation about a horizontal axis, the plates being axially spaced apart a distance less than the length of any of the rough-cut lengths of extrudate, each holder means having notches spaced around the periphery of the plates, the notches in one plate being aligned with the notches in the other, the carrier plates being operatively positioned below the opening in the bottom of the magazine so that a pair of aligned notches on the plates is adapted to receive a length of extrudate when such pair is positioned below the opening, the plates being axially positioned relative to the opening such that the axial ends of an extrudate received in a pair of aligned notches projects beyond the respective axial end faces of the plates.

5. Apparatus according to claim 4, wherein the cutter discs are respectively engaged with a peripheral portion of the outer axial end faces of the carrier plates.

6. Apparatus according to claim 5, wherein each cutter disc has a flat surface generally perpendicular to the axis of rotation with a tapered periphery, the flat surfaces of the discs partially overlying and being slidably engageable with the respective outer axial end faces of the carrier plates.

7. Apparatus according to claim 6, wherein the aligned notches of the carrier plates comprise notches which are substantially semi-circular defined by a radially extending side and an inclined edge on its leading side.

8. Apparatus according to claim 7, wherein the knife discs overlie and slidably engage the carrier plates at a vertical location intermediate the axis of rotation of the carrier plates and the top-most periphery thereof.

9. Apparatus according to claim 6, including means engaging each cutter disc for maintaining the axial spacing between the flat surfaces of the discs.

10. Apparatus according to claim 6, wherein the means for heating the cutter disc includes a resistance element connected to each disc in heat-transfer relationship, and a pair of slip-rings mounted on each disc and electrically connected to the resistance element, and a pair of stationary brushes for each pair of slip-rings and operatively engaged therewith for electrically connecting the resistance elements of a power source.

11. Apparatus according to claim 7, including conveyor means having a receiving end located vertically below the carrier plates for receiving trimmed lengths of extrudate.

12. Apparatus according to claim 11, wherein the conveyor means includes a first conveyor having a pair of spaced shafts rotatably mounted below the carrier plates, each shaft carrying a pair of spaced V-belt pulleys so that the two pairs of aligned pulleys are defined, and a V-belt operatively engaged over each aligned pair of pulleys.

13. Apparatus according to claim 12, wherein the conveyor means includes a second conveyor having a flat belt with a run located below the level of the tops of the V-belt pulleys and being located partially between the two shafts.

14. Apparatus according to claim 1, wherein the hopper means includes, a hopper for receiving lengths of extrudate in a horizontal position, the hopper having a pair of spaced side walls elongated in the direction of the axis of the extrudate and means for vibrating one of the side walls in the horizontal direction.

15. Apparatus according to claim 14, wherein the hopper means includes a magazine for horizontally orienting the lengths of an extrudate one above another, the magazine having vertically oriented walls that are adjustable to vary the spacing therebetween to accommodate extrudate of different cross-sectional sizes.